April 3, 1956
E. H. SHAFF
2,740,508
TORQUE CONTROL MEANS FOR POWER OPERATED TORQUE
WRENCHES, NUT SETTERS AND THE LIKE
Filed Dec. 24, 1952
2 Sheets-Sheet 1
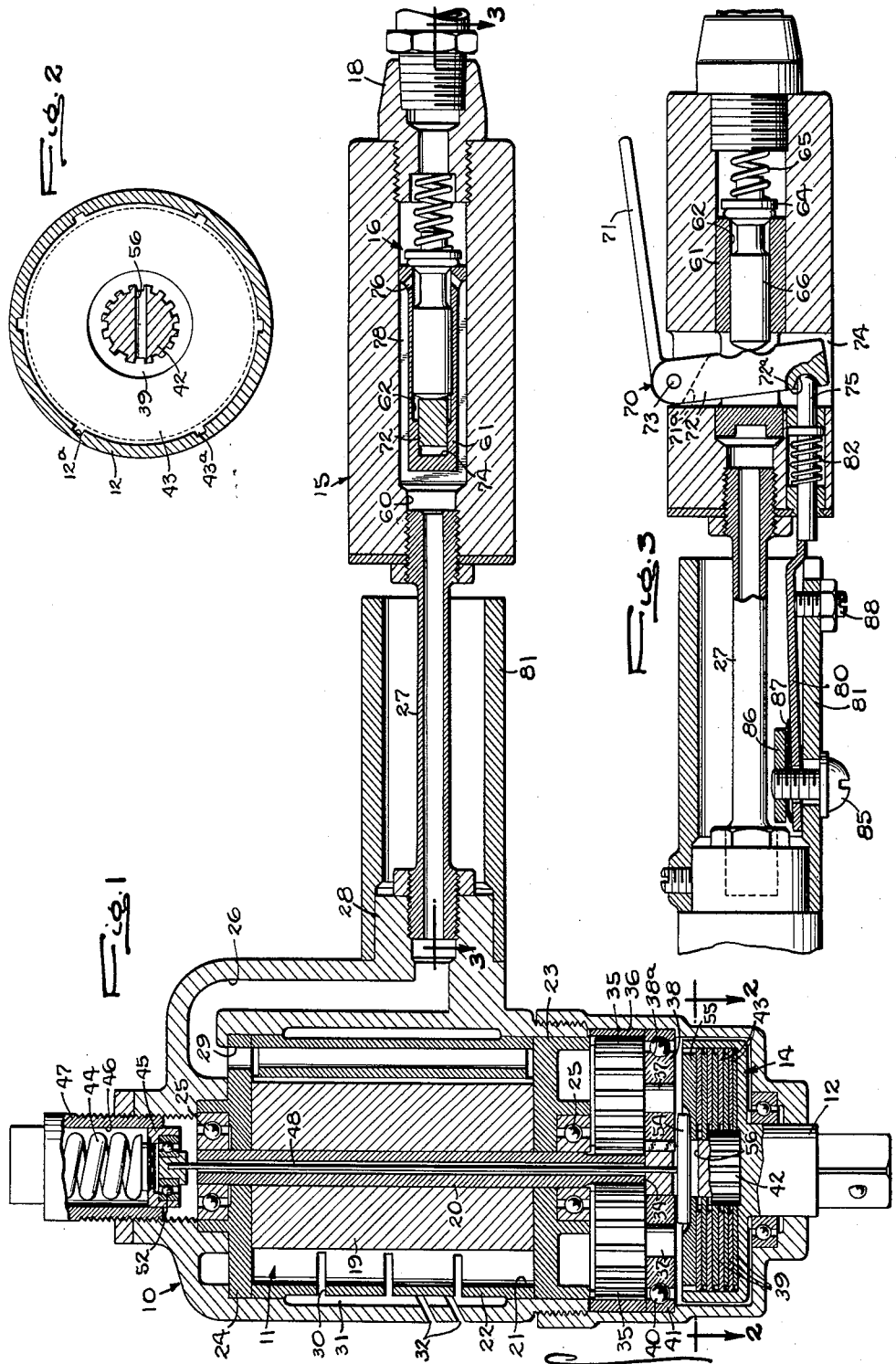
INVENTOR
Ernest H. Shaff
By: Carlson, Pitzner, Hubbard & Wolfe
ATTORNEY April 3, 1956 E. H. SHAFF 2,740,508
TORQUE CONTROL MEANS FOR POWER OPERATED TORQUE
WRENCHES, NUT SETTERS AND THE LIKE
Filed Dec. 24, 1952 2 Sheets-Sheet 2
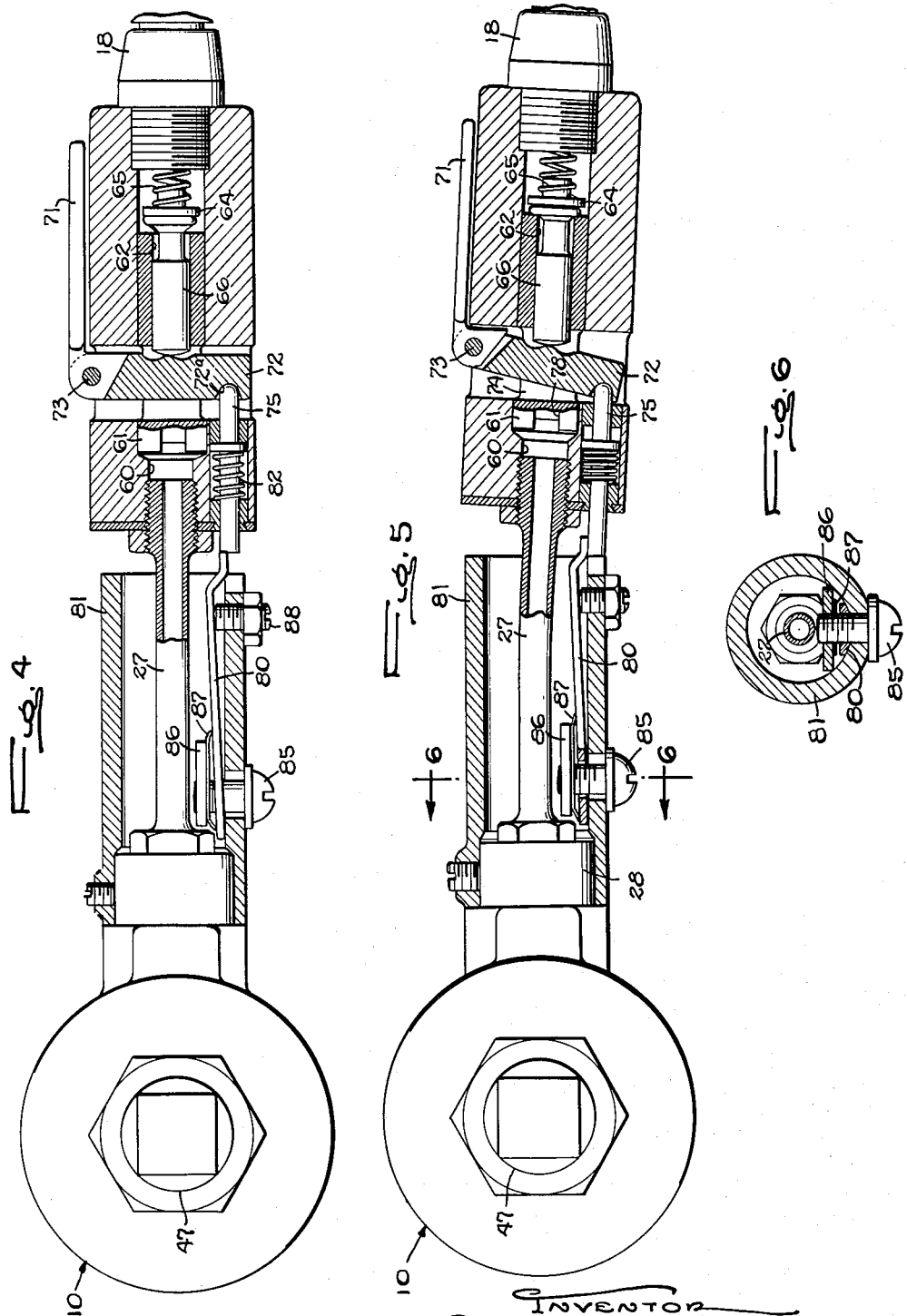
INVENTOR
Ernest H. Shaff
By: Carlson, Pitzner, Hubbard & Wolfe
ATTORNEY

United States Patent Office 2,740,508
Patented Apr. 3, 1956

2,740,508

TORQUE CONTROL MEANS FOR POWER OPERATED TORQUE WRENCHES, NUT SETTERS AND THE LIKE

Ernest H. Shaff, Penn Park, Hamilton, Ind., assignor, by mesne assignments, to Gardner-Denver Company, a corporation of Delaware Application December 24, 1952, Serial No. 327,805

8 Claims. (Cl. 192—.034)

The present invention relates generally to portable power driven tools such as torque wrenches, nut setters and the like and more particularly to an improved control means for such tools whereby accurate torque setting of screw-threaded fastening elements obtains.

It is the general object of the present invention to provide in a power actuated tool of the type for running and setting screw-threaded fastening elements an improved torque responsive control by means of which momentum acquired by the rapidly rotating driving components thereof during free-running of a fastening element is prevented from being transmitted to the driven components thereof and thence to the fastening element to the end that accurate setting of the fastening element can be achieved.

The object of the invention thus generally set forth, together with other objects and ancillary advantages, are attained by the construction and arrangement shown by way of illustration in the accompanying drawings, in which:

Figure 1 is a central longitudinal section through a tool embodying the features of the present invention.

Fig. 2 is a transverse section taken substantially in the plane of line 2—2 in Fig. 1.

Fig. 3 is a fragmentary longitudinal section taken substantially in the plane of line 3—3 in Fig. 1.

Figs. 4 and 5 are plan views partly in section, which sections are similar to Fig. 3, showing different relative positions of the components of the illustrative tool.

Fig. 6 is a transverse section taken substantially in the plane of line 6—6 in Fig. 5.

While the invention is susceptible of various modifications and alternative constructions, there is shown in the drawings and will herein be described in detail the preferred embodiment. It is to be understood however, that it is not thereby intended to limit the invention to the specific form disclosed. On the contrary, it is intended to cover all modifications and alternative constructions falling within the spirit and scope of the invention as expressed in the appended claims.

As illustrated in the drawings, the exemplary form of the invention is shown embodied in a portable, pneumatic nut setter which includes a generally cylindrical casing 10, having a rotary pneumatic motor 11 therein for driving a spindle 12 through the medium of a driving mechanism which includes a clutch generally indicated at 14. As shown, the casing 10 is equipped with a laterally projecting handle 15. The handle has conveniently incorporated therein a throttle valve mechanism 16 for controlling the supply of pressure fluid, in this instance compressed air, to the motor 11 of the tool. The handle 15 is equipped at its outer end with a suitable fitting 18 for the reception of a pressure fluid supply hose.

The motor 11 is of conventional form and includes a vaned rotor 19 supported on a shaft 20 and rotatable in an eccentrically disposed motor chamber 21 defined by a cylinder 22 and end plates 23 and 24. The end plates are conveniently recessed for the reception of bearings 25 for journaling the motor shaft 20.

From the valved handle 15 pressure fluid is supplied to the motor chamber 21 by way of a tortuous passage 26 formed in the casing 10 and by way of a tubular member 27 interposed between the handle 15 and a boss 28 formed integral with the casing. The tube 27 additionally serves to support the handle 15 on the casing 10 in laterally spaced relation thereto. From the passage 26 live pressure fluid is admitted to the motor chamber 21 by way of an inlet port 29 formed in the rear end plate 24. Spent pressure fluid is exhausted from the motor chamber 21 by way of exhaust slots 30 formed in the cylinder 22, an annular exhaust chamber 31 defined by the casing 10 about the cylinder 22, and thence to the atmosphere by way of ports 32 in the casing 10.

The driving connection between the motor 11 and spindle 12 includes not only the clutch 14 but also speed reduction gearing. This speed reduction gearing is preferably of the planetary type and includes a driving or sun gear 34, rigid with the forward end of the motor shaft 20, and idler or planetary gears 35, which are rotatable within a fixed ring-gear 36. The planetary gears 35 are journaled on pins 37 carried by a spider 38.

The spider 38 is disk-shaped and is formed with a peripheral groove 38a which serves as an inner race for anti-friction bearing elements 40, here shown in the form of balls. The outer race for the balls 40 is formed by an internally grooved ring 41 fixed within the casing 10.

As shown, the clutch 14 is of the friction-disk type. The disk-like driving elements 39 thereof are splined to a stub shaft 42 fixed centrally of the spider 38 and projecting forwardly therefrom. The driven elements 43 of the clutch are also of disk form and are interleaved between the driving clutch disks 39. The driven clutch disks are keyed to the spindle 12. For this purpose the rear end of the spindle is of enlarged cup-like form and is provided with a series of spaced, internal, longitudinally disposed grooves 12a for the reception of key-like projections 43a formed integral with each of the driven clutch elements. The spindle 12 is journaled intermediate its ends in the forward end of the casing 10 by means of an anti-friction bearing which is preferably of the radial-thrust type. The forward end of the spindle is squared and is equipped with suitable detent means for the reception of a socket adapter or the like (not shown) to accommodate the same to a fastening element which is to be run and set by the tool.

In accordance with the present invention, there is provided means for adjustably maintaining a connection between the driving and driven components of the tool according to a desired torque setting for a fastening element being driven by the tool, together with means normally conditioned to permit the application of power to the tool and effective to interrupt the supply of power to the tool just before the attainment of the desired torque setting. By virtue of this combination of means, the supply of power for actuating the tool is cut off in anticipation of the attainment of the desired torque setting by the fastening element being driven; the majority of the momentum acquired by the driving components of the tool during free-running of the fastening element is utilized to achieve the desired torque setting, and since power supply is interrupted there is no more driving force and any excess momentum is quickly and harmlessly dissipated. Thus exceedingly accurate torque setting of the fastening element by power obtains.

More particularly the clutch mechanism, generally designated 14, is of the so-called overload-release type and included in the tool is means for adjusting its point of release. In conjunction therewith the valved handle 15 of the tool is constructed so as to be normally conditioned to permit the application of pressure fluid to actuate the tool and is arranged to cut off the pressure fluid supply just before the desired torque setting of the fastening element being driven obtains according to the predetermined point of release of the clutch.

As previously noted the clutch 14 is of the friction-disk type. In the illustrative form of the invention the driving and driven disks 39 and 43, respectively, thereof are urged into engagement by means of an expansion type spring 44 acting through a plunger 45 and a push rod 48. As shown the plunger 45 is reciprocable under the action of the spring 44 in a cylindrical recess 46, defined by a generally cylindrical plug 47 which is received in the rear end of the casing 10. The push rod 48, at its rear end, is seated in a bearing 52 carried by the plunger 45, and extends coaxially through the hollow motor shaft 20 and partially through the driving stub shaft 42 of the clutch 14.

In order to transmit force excited by the spring 44 on the plunger 45 from the plunger to the clutch 14 so as to effect driving engagement between the driving disks 39 and the driven disks 43 thereof, a pin 54 and a pressure plate 55 are interposed between the forward end of the push rod 48 and the uppermost one of the driving clutch disks 39. The pin 54 is received in a transversely disposed, axially elongated slot 56 formed intermediate the ends of the stub shaft 42. Th ends of the pin 54 bear on the upper surface of the plate 55.

In order to effect adjustment of the point of release of the clutch 14, the plug 47 is screw-threaded into the rear end of the casing 10 so as to permit adjustment of its axial position relative thereto whereby to vary the tensioning of the spring 44.

As previously noted the valved handle 15 is constructed and arranged to interrupt the supply of pressure fluid to the tool just prior to the point of release of the clutch 14. Thus the handle 15 which is equipped with the valve mechanism 16 has incorporated therein valve operating means normally conditioned to permit the supply of pressure fluid to the tool upon operation of the valve mechanism 16 which means is effective to cut off the supply of pressure fluid upon relative movement between the handle 15 and the casing 10 in response to the setting resistance offered by the fastening element being driven by the tool.

The necessary relative movement between the handle 15 and the casing 10 obtains by virtue of the somewhat flexible character of the supporting tube 27 which is interposed between the handle and the casing.

The handle 15 has a stepped, axial bore 60 therein within the forward end of which is received the rear end of the tube 27 and within the rear end of which is received the fitting 18. The valve 16 is disposed intermediate the ends of the bore 60. It includes a bushing 61 which is fixed within the bore 60 and is provided with a coaxial bore 62. The valve 16 also includes a poppet element 64 which seats against the rear end of the bushing 61. The poppet element 64 is normally biased into closed position by means of a spring 65 and by the action of live pressure fluid thereon in the rear end of the handle bore 60. Rigid with the valve element 64 is a forwardly projecting stem 66, which is axially shiftable within the bore 62 of the bushing 61.

The operating mechanism for the valve 16 includes an operating lever 70. The lever 70 is of articulated form having a fingerpiece 71 normally disposed along one side of the handle 15 for convenient manipulation, and a valve operating piece 72. The latter is received in a slot 74 which extends transversely through the handle 15 and through the forward end portion of the bushing 61. At their adjacent ends the valve operting piece 72 is bifurcated and the fingerpiece 71 is provided with a depending tang 71A. The tang 71A is received within the bifurcated upper end of the valve operating piece 72, and the two pieces are pivoted together as by a pin 73. The tang 71A and the bifurcated end of the valve operating piece 72 are so formed that the valve operating piece can move forwardly (in a clockwise direction as viewed in Fig. 5) about the pivot pin 73. However, relative movement in the opposite direction is prevented.

Adjacent to the lower end the valve operating piece 72 is fulcrumed on a pin 75 carried in the handle 15. The pin 75 projects rearwardly into the slot 74 and its outer end is made of generally hemispherical form for reception in a somewhat larger hemispherical recess 72a adjacent the lower end of the valve operating piece 72.

With the valve operating mechanism normally conditioned to admit pressure fluid to actuate the tool, upon depressing the fingerpiece 71 of the lever 70, the valve operating piece 72 thereof is moved rearwardly into a substantially upright position (Fig. 4). Intermediate its ends the valve operating piece 72 is in engagement with the forward end of the valve stem 66. Thus rearward movement of the piece 72 produces similar movement of the valve stem 66 and of the poppet 64 against the action of the spring 65 and live pressure fluid thereon to the end that the poppet 64 is unseated. Pressure fluid in the handle bore 60, behind the bushing 61 is thus supplied by way of ports 76 and a pair of longitudinal channels 78 in the bushing 61 to the forward end of the handle bore 60 and thence by way of the tubular supporting member 27 to the main air supply passage 26 in the casing 10.

Means is provided to utilize the relative movement between the handle 15 and the casing 10, that occurs when fastening element being driven by the tool is run down tight and seating resistance is encountered, to release the valve 16 so as to interrupt the supply of pressure fluid to the tool. For this purpose the valve operating mechanism includes trigger means effective to permit forward movement of the valve operating piece 72 of the lever 70 so as to release the valve stem 66 and permit the poppet member 64 to be seated against the rear end of the bushing 61 by the action of the spring 65 and pressure fluid thereon. In the present instance, this trigger means includes the fulcrum pin 75 and a latch member 80. The latch member is adjustably supported within a housing 81, which is rigid with the boss 28 of the casing 10 and projects rearwardly therefrom about the tubular member 27. The housing 81 terminates in spaced relation to the handle 15. The pin 75 is constrained to longitudinal movement within the handle 15 and is normally biased rearwardly by means of a spring 82. The forward end of the pin 75 projects forwardly from the handle 15 where it is adapted to engage the rear end of the latch member 80.

It will be seen that the spring 82 in its action to bias the pin 75 rearwardly also serves to bias the valve operating lever 70 into its normal "at rest" position as shown in Fig. 3. More particularly rearward motion of the pin 75 under the influence of the spring 82 serves to move the inner end of the valve operating piece 72 rearwardly with a corresponding forward movement of the upper end thereof. Since the construction of the lever 70, as previously described, is such that clockwise movement of the finger piece 71 with respect to the valve operating piece 72 is prevented, the fingerpiece 71 is raised into the position shown in Fig. 3 upon rearward movement of the lower end of the piece 72.

When free-running of the fastening element being driven is completed and seating resistance is encountered, relative lateral movement is produced between the handle 15 and the casing 10, thus relative movement between the handle 15 and the latch member 80 is also effected. As a result the forward end of the pin 75 is moved laterally so that it can slip from engagement with the end of the latch member 80. When the pin 75 does slip from engagement with the latch member 80, the pin is freed for forward movement. So, too, the lower end of the valve operating piece 72 of the lever 70 is permitted to move forwardly into the position shown in Fig. 5. Thus the valve stem 66 and the poppet 64 are released to the action of the biasing spring 65 and to the action of fluid pressure in the rear end of the handle bore 60, to the end that the poppet 64 is seated. The result is that pressure fluid to the tool is interrupted and no further driving force is applied.

Provision is made for adjusting the point of release for the valve 16 and its operating mechanism whereby to permit adjustment thereof according to the tensioning of the clutch spring 44 to the end that the supply of pressure fluid to the tool is interrupted just before the point of release of the clutch 14. In the present instance for this purpose, the latch member is made adjustable in its position with respect to the fulcrum pin 75. The latch member 80 is held in place by a screw 85 which is threaded into a plate 86. The plate 86 is disposed within the housing 81 and its sides engage the inner surface thereof. Thus the plate serves as a nut for the screw 85. Interposed between the plate 86 and the latch member 80 is a leaf spring 87, which serves to bias the latch member outwardly. Adjacent the rear end of the housing 81 is an adjusting screw 88 which extends through the side wall of the housing for engagement with the latch member 80. It will be apparent that the axial position of the screw 88 serves to determine the normal relative location of the rear end of the latch member 80 with respect to the housing 81 and thus with respect to the normal relative position of the pin 75 in the handle 15. Inward movement of the adjusting screw 88 causes the latch member 80 to be moved inwardly so that the amount of the end surface thereof for engagement with the forward end of the pin 75, when the handle and the housing 81 occupy their normal, or "at rest" positions, is reduced. As a result, a small amount of relative movement of the pin 75, as the handle 15 is moved laterally relative to the casing 10 and the housing 81, is required to release the pin. Similarly a greater amount of movement will be required to release the pin 75 upon withdrawing the adjusting screw 88, as required for a higher torque setting adjustment.

In view of the foregoing, it will be apparent that a nut setter, or the like, constructed in accordance with the present invention is effective to interrupt the application of power to operate the tool just before the desired torque setting for a fastening element being driven thereby obtains according to the setting of the point of release of the clutch between the driving and driven components of the tool as determined by the tensioning adjustment of the clutch spring. With this arrangement the momentum acquired by the rapidly rotating driving components of the tool during free-running of the fastening element being driven by the tool is utilized to bring the fastening element to its finally desired torque setting. When this obtains, excess momentum, if any, is harmlessly dissipated in clutch slippage so that exceedingly accurate torque setting of the fastening element by power is achieved.

I claim as my invention:

1. A pressure fluid operating tool for running and setting a threaded fastening element comprising, in combination, a casing, a fluid motor disposed within said casing, a spindle journaled in said casing, a friction-disk clutch interposed between said motor and said spindle having driving disks operatively connected with said motor and driven disks operatively connected with said spindle, means including a biasing spring normally urging said driving and driven disks into engagement, said means being adjustable to vary the point of slip of said clutch according to a desired torque setting for a fastening element to be driven by the tool, a handle including a valve for controlling the supply of pressure fluid to the motor, a member supporting said handle and said casing in laterally spaced relation, said member being yieldable to permit relative movement between said casing and said handle when setting resistance of the fastening element being driven by the tool is encountered and means for closing said valve upon such relative movement between said casing and said handle, said last mentioned means being adjustable in relation to the setting of said first mentioned means to interrupt the supply of pressure fluid to the motor just prior to the fastening element attaining the desired torque setting.

2. A pressure fluid operated tool for running and setting a threaded fastening element comprising, in combination, a casing, a fluid motor disposed within said casing, a spindle journaled in said casing and adapted to be driven by said motor, a normally engaged clutch interposed between said motor and said spindle, means including a spring operatively connected with said clutch for maintaining engagement thereof, said means being adjustably yieldable to permit slip of said clutch upon the attainment of a desired torque setting by the fastening element being driven, a handle including a valve for controlling the supply of pressure fluid to the motor, a member supporting said handle and said casing in laterally spaced relation, said member being yieldable to permit relative movement between said casing and said handle upon the attainment of a desired torque setting by the fastening element, and means responsive to said relative movement for closing said valve to interrupt the supply of pressure fluid to the motor, said last mentioned means being adjustable according to the predetermined adjustment of said first mentioned means so that said valve is closed just prior to the fastening element attaining the desired torque setting.

3. A pressure fluid operated tool for running and setting a threaded fastening element comprising, in combination, a casing, a fluid motor disposed within said casing and having a hollow shaft, a spindle journaled in one end of said casing, an overload release clutch having driving and driven elements interposed between said motor and said spindle and operatively connected thereto respectively, a plunger reciprocable longitudinally with respect to said casing, a spring engageable with said plunger, and urging the same forwardly with respect to said casing, a push rod extending through said hollow shaft and interposed between said plunger and one of said clutch elements for normally effecting engagement of said clutch, and means for adjusting the tensioning of said spring to determine the point of slip of said clutch so as to determine the desired torque setting for a fastening element being driven by the tool, a handle including a valve for controlling the supply of pressure fluid to the motor, a member supporting said handle and said casing in laterally spaced relation, said member being yieldable to permit relative movement between said casing and said handle in accordance with setting resistance encountered during the driving of said fastening element, and means for operating said valve and effective to close the same upon relative movement between said casing and said handle to interrupt the supply of pressure fluid to the motor.

4. In a power operated tool for running and setting a threaded fastening element having a motor and a spindle adapted to be driven by the motor, the combination comprising a clutch having driving and driven elements affording a driving connection between the motor and the spindle, means normally urging said elements into engagement, said means being adjustably yieldable according to a predetermined desired torque setting for the fastening element to be driven by the tool enabling said elements to slip upon the attainment of the desired torque setting by the fastening element, means for controlling the supply of power to the motor and means responsive to setting resistance encountered upon tightening the fastening element for effecting operation of said power supply controlling means to interrupt the supply of power to the motor, said last mentioned means being adjustable in accordance with the adjustment of said first mentioned means so that the supply of power to the motor is interrupted just prior to the fastening element attaining the predetermined desired torque setting.

5. In a power operated tool for running and setting a threaded fastening element and having a motor and a spindle adapted to be driven by the motor, the combination comprising an overload release type clutch interposed between said motor and said spindle, said clutch being adapted to slip upon the attainment of a desired torque setting by the fastening element to be driven by the tool, means for controlling the supply of power to the motor and means responsive to setting resistance encountered upon tightening the fastening element for effecting operation of said power supply controlling means to interrupt the supply of power to the motor just prior to the fastening element attaining the desired torque setting.

6. A pressure fluid operated tool for running and setting a threaded fastening element comprising, in combination, a casing, a fluid motor disposed within said casing and having a hollow shaft, a spindle journaled in one end of said casing, a clutch having driving and driven elements interposed between said motor and said spindle and operatively connected thereto respectively, a plunger reciprocable longitudinally with respect to said casing a spring engageable with said plunger and urging the same forwardly with respect to said casing, and a push rod extending through said hollow shaft and interposed between said plunger and one of said clutch elements for normally effecting engagement of said clutch.

7. A pressure fluid operated tool for running and setting a threaded fastening element comprising, in combination, a casing, a fluid motor disposed within said casing and having a hollow shaft, a spindle journaled in one end of said casing, a slippable clutch having driving and driven elements interposed between said motor and said spindle and operatively connected thereto respectively, a plunger reciprocable longitudinally with respect to said casing, a spring engageable with said plunger and urging the same forwardly with respect to said casing, a push rod extending through said hollow shaft and interposed between said plunger and one of said clutch elements for normally effecting engagement of said clutch, and means for adjusting the tensioning of said spring to determine the point of slip of said clutch so as to determine the torque setting for a fastening element being driven by the tool.

8. A power operated tool for running and setting threaded fastening elements and having a motor and a spindle adapted to be driven by the motor characterized by the combination of means for controlling the supply of power to the motor with means responsive to setting resistance encountered upon tightening a fastening element for effecting operation of said power supply controlling means to interrupt the supply of power to the motor.

References Cited in the file of this patent

UNITED STATES PATENTS

| | | |
|---|---|---|
| 2,484,364 | Whitledge | Oct. 11, 1949 |
| 2,525,379 | Smilansky | Oct. 11, 1950 |
| 2,606,431 | Elgin | Aug. 12, 1952 |
| 2,614,419 | Shaff | Oct. 21, 1952 |
| 2,700,443 | Boice | Jan. 25, 1955 |